No. 652,366. Patented June 26, 1900.
H. D. LANE.
MECHANICAL MOVEMENT.
(Application filed Mar. 31, 1900.)
(No Model.)
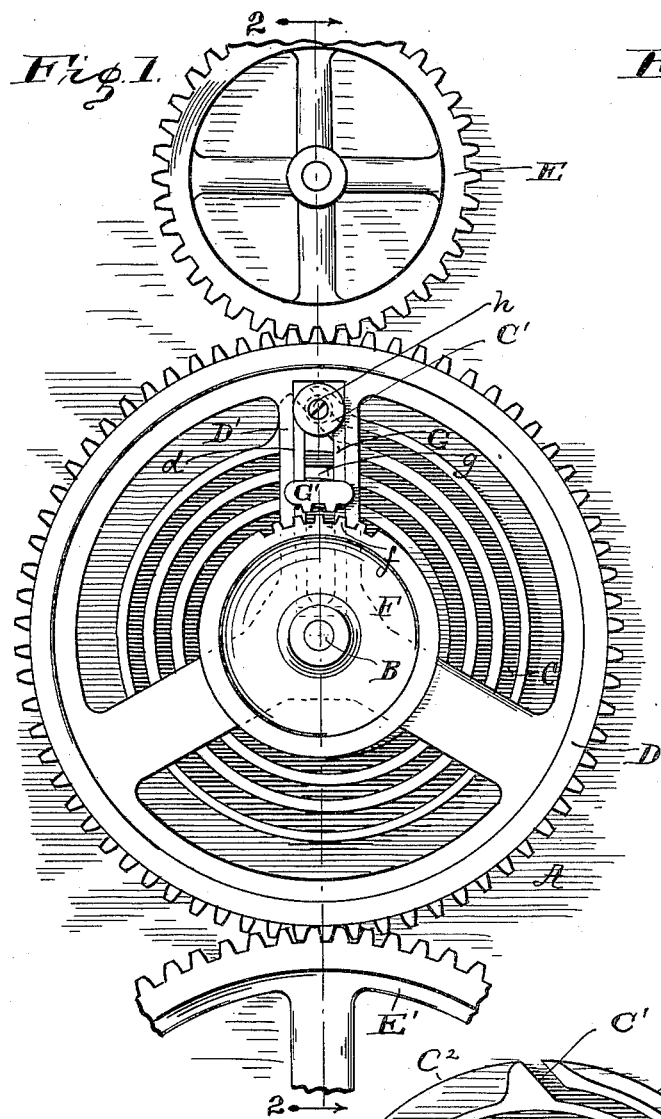
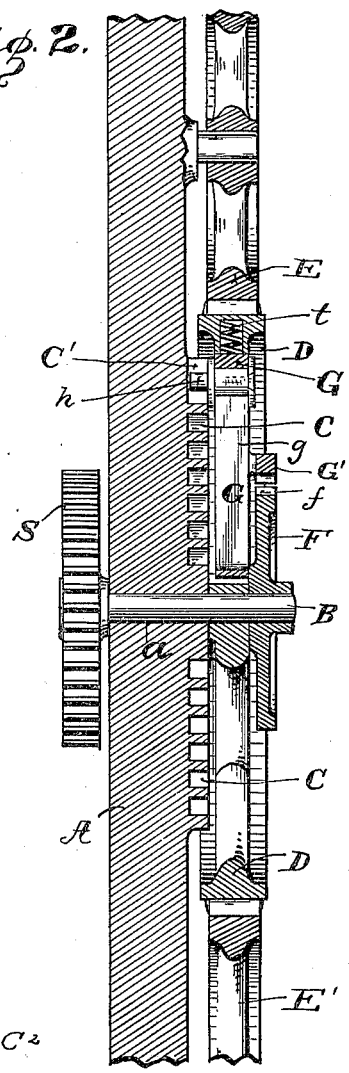
Witnesses,
Nathan Kahn
John R. Sherwood
Inventor,
Henry D. Lane,
By Joseph A. Minturn
Attorney.

UNITED STATES PATENT OFFICE.

HENRY D. LANE, OF INDIANAPOLIS, INDIANA.

MECHANICAL MOVEMENT.

SPECIFICATION forming part of Letters Patent No. 652,366, dated June 26, 1900.

Application filed March 31, 1900. Serial No. 11,011. (No model.)

*To all whom it may concern:*

Be it known that I, HENRY D. LANE, a citizen of the United States, residing at Indianapolis, in the county of Marion and State of Indiana, have invented certain new and useful Improvements in Mechanical Movements, of which the following is a specification.

This invention relates to improvements in mechanism for rendering operative or inoperative, as the case may be, certain parts after a predetermined number of revolutions of a master-wheel, and is applicable to time-locks, counting-machines, various kinds of registers, and the like.

The accompanying drawings illustrate my invention, in which—

Figure 1 is a view in side elevation; Fig. 2, a vertical section on the dotted line 2 2 of Fig. 1, and Fig. 3 a view of the helically-grooved plate detached from the remaining parts of the mechanism.

Like letters of reference indicate like parts throughout the several views of the drawings.

A is the plate to which the mechanism is directly secured. It may stand horizontally or vertically and in most cases will probably be a part of the frame of the machine to which this device is applied as an attachment; but it should be understood that I do not in any wise limit the manner of applying my improved mechanism, but desire to leave that to the exigencies of the occasion. Said plate A has the cylindrical bore $a$, in which is mounted the shaft B. Surrounding the shaft B is the helical groove C, which is in the shape of a coil decreasing in radius as it approaches the center B, as is clearly shown in Fig. 3. The groove terminates on the outside with the straight portion C', which is oblique to a line drawn diametrically through the coil. The purpose of the groove and of the helical and oblique portions thereof will be hereinafter fully explained.

D is the master-wheel, which is mounted on the shaft B, but turns loosely thereon and not with the shaft. This wheel may be driven from any suitable source of power by means of a belt connection therewith, or, as is shown in the drawings, it may have peripheral cogs and be driven by engagement with the cogs of a spur gear-wheel E, which may be one of a train of gears connecting with a source of power. (Not shown.) E' represents part of a third toothed wheel, which is driven by the wheel D and is connected with any suitable mechanism to be actuated.

Mounted on shaft B outside of wheel D is the wheel F, having marginal cogs $f$. This wheel F is fixed to shaft B, so as to rotate with it. On the opposite end of shaft B is spur-gear S, which connects with any suitable and desired mechanism (not shown) which it is desired to set in motion independently of and at different intervals from the mechanism driven from wheel E'.

Referring to the wheel D, one of its radial arms D' has a longitudinal slot $d$, in which is a slide G, shorter than the slot and having an outwardly-projected integral cross-head or dog G', with teeth to engage the teeth of wheel F. A longitudinal movement of the slide G engages and disengages the dog and toothed wheel F, and this longitudinal movement of the slide is obtained by a stud-pin $h$, which travels in the helical groove C and contacts at the outer end of its travel in said groove with the oblique portion C', previously referred to. The said stud-pin has movement longitudinally of the slide G by being loosely seated in a slot $g$ in said slide in the manner as clearly shown in Fig. 2, and, as shown in said Fig. 2, the slide G is pressed by spring $t$ in toward the shaft B, thereby holding the teeth of the dog in engagement with the teeth of wheel F, except when the stud-pin $h$, being at the outer end of slot $g$ in slide G, is forced out farther by contact of stud-pin with oblique groove C' with force enough to overcome the spring $t$. Then the slide G and dog G' will be forced out in a manner to release the wheel F. If it is desired that the dog be held in disengagement with the wheel F during a continued movement in the same direction of the wheel D, the stud-pin will pass from the groove C' to the track C², which is concentric with the shaft B and of a diameter requisite to hold the dog out of engagement with the teeth of the wheel F; but on a reversal of the direction of movement of the wheel D the stud-pin will reënter the helical groove, releasing the spring and allowing it to press the slide in, thereby carrying the dog into engagement with the teeth of wheel F, which in turn sets in motion whatever mechanism is connected to wheel S. The helical groove merges at the center of the coil into a groove concentric with the shaft B, the separation between the concentric groove and the helical one being had by the spring $n'$, which, as shown, allows the stud-pin to pass in concentric circles around the shaft B when going in one direction, but will immediately throw the pin into the spiral or helical groove when the direction of travel of the pin is reversed, and the throw out of the dog from wheel F will always occur at the completion of as many revolutions of wheel D as there are coils in the helical groove.

Having thus fully described my invention, what I claim as new, and wish to secure by Letters Patent of the United States, is—

1. A revoluble shaft, a wheel mounted loosely thereon, a second wheel having marginal teeth mounted on said shaft and revolving therewith, a radially-adjustable dog on the loose wheel, a spring to press the dog into engagement with the second toothed wheel or segment and means for disengaging said dog therefrom consisting of a stud-pin connected with the dog and taking into a fixed helical groove and said groove having an irregular formation to move the stud-pin so as to compress the spring and disengage the dog, substantially as described and shown.

2. A shaft, a wheel mounted loosely thereon having a radial slot with a slide therein having a projecting dog said slide being also slotted, a stud-pin movably mounted in the slot of the slide and taking into a helical groove of a stationary plate, a spring to press the slide and its dog toward the shaft, a toothed wheel or segment mounted on said shaft to rotate with it, said teeth being engaged by the spring-pressed dog and said helical groove having a sudden terminal outward trend or irregular formation to disengage the dog from the toothed wheel or segment by forcing the stud-pin out against the slide to cause the latter to compress the spring, substantially as described and specified.

3. A shaft, a toothed wheel or segment mounted on and revolving with said shaft, a plate parallel with said wheel having a helical groove on its side adjacent to the wheel, the coils of which are concentric with the shaft, said groove having a straight outer terminal oblique to the diameter of the coils, a wheel mounted loosely on the shaft between the grooved plate and the fixed wheel or segment, said loose wheel having a radially-slotted arm, a slide in said arm carrying a dog to engage the teeth of the fixed wheel or segment, and a spring to press the slide in a direction to engage the teeth of the fixed wheel, said slide being slotted longitudinally, and a stud-pin mounted loosely in the slotted slide and having its ends taking into the helical groove, substantially as described and shown.

In witness whereof I have hereunto set my hand and seal, at Indianapolis, Indiana, this 27th day of March, A. D. 1900.

HENRY D. LANE. [L. S.]

Witnesses:
NATHAN KAHN,
JOHN B. SHERWOOD.